April 30, 1968     A. ONYSKIN     3,380,287
TORQUE MEASURING DEVICE
Filed Oct. 19, 1965     2 Sheets-Sheet 2
FIG.5
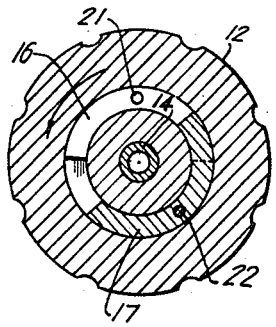
FIG.6
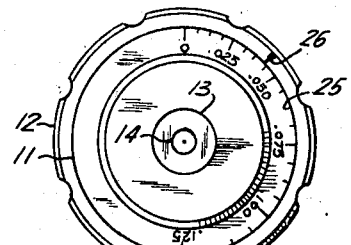
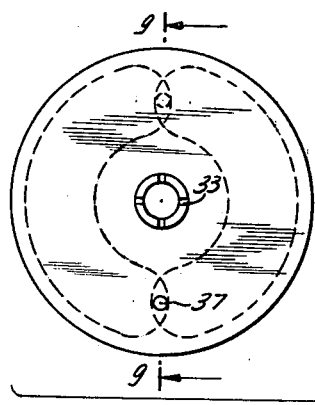
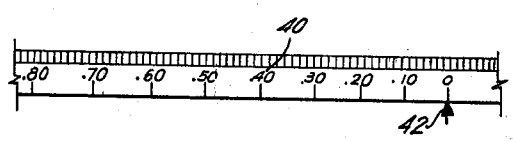
FIG.7
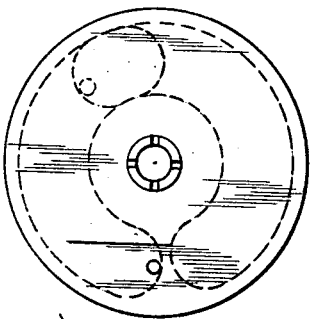
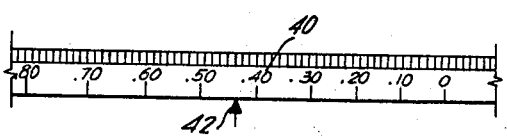
FIG.8
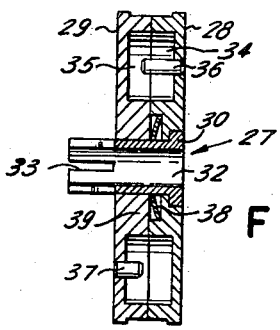
FIG.9
INVENTOR.
ALEXANDER ONYSKIN
BY

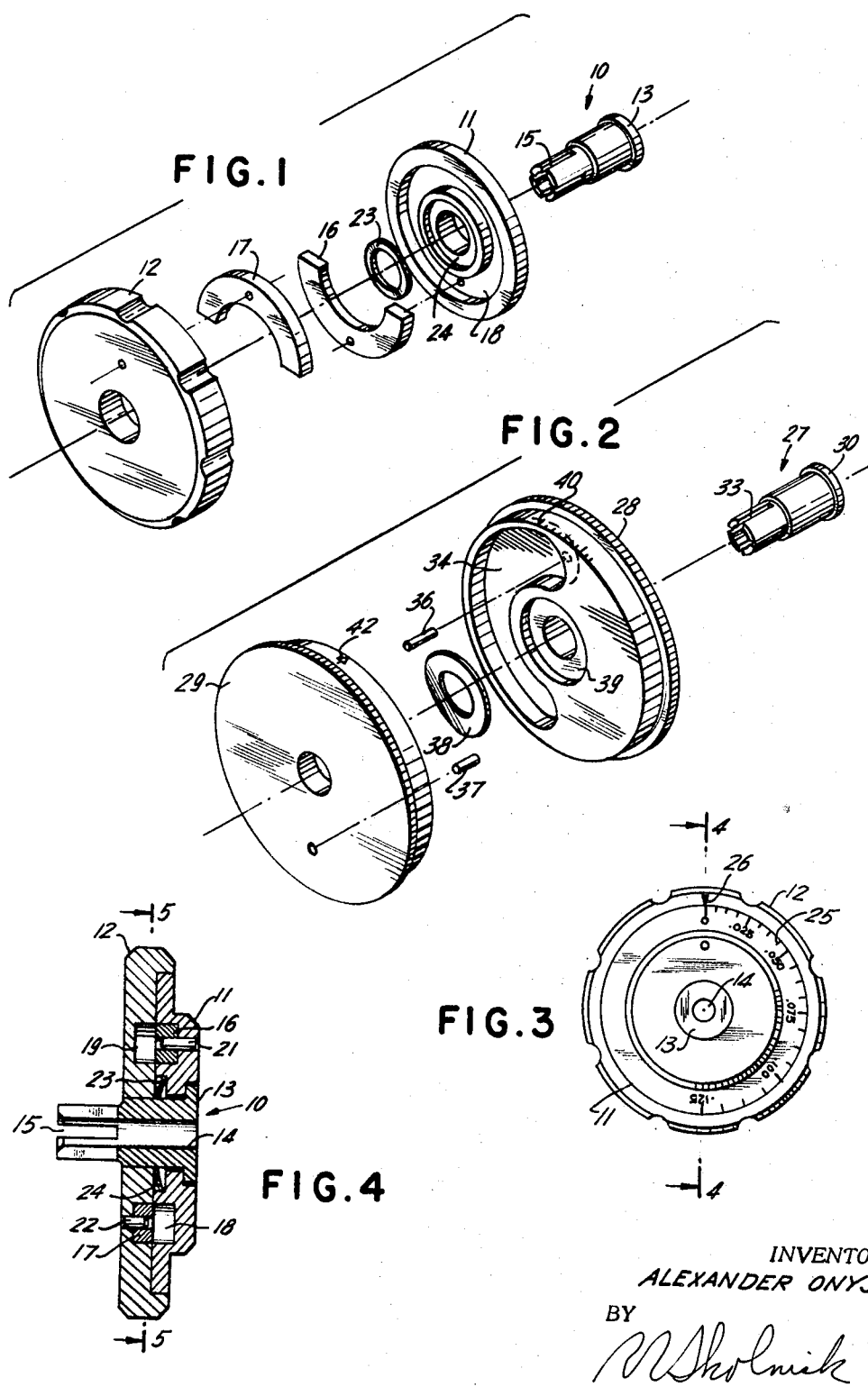

United States Patent Office 3,380,287
Patented Apr. 30, 1968

3,380,287
TORQUE MEASURING DEVICE
Alexander Onyskin, 56 Anoatok,
Huntington, N.Y. 11743
Filed Oct. 19, 1965, Ser. No. 497,617
4 Claims. (Cl. 73—1)

ABSTRACT OF THE DISCLOSURE

An apparatus for measuring the torque of a rotating component by the use of two disks which are mounted on the shaft of a rotatable component and rotating the disks relative to each other to form an unbalanced mass. The amount of rotation relative to each other being calibrated so that the relative rotation of the disks is a measure of the torque required to rotate the shaft of the component.

---

This invention relates in general to torque measuring devices and more particularly to devices for measuring the torque of rotating components.

The moment of force, or torque, about an axis is the effectiveness of the force to produce rotation about that axis. It is measured by the product of the magnitude of the force and the perpendicular distance from the axis of rotation to the line of action of the force.

Heretofore, whenever the torque of a rotating component or the torque requirements of a gear train were required to be measured a known weight was suspended at a known distance from the axis of rotation. Then either the weight was varied or the distance from the axis of rotation was changed until the component or gear train started to turn. The weight (force) multiplied by the distance from the axis of rotation was the torque requirements of the component or gear train.

Another commonly used means for measuring torque is the use of calibrated springs attached to the axis of rotation of a component or gear train whose torque requirements are to be measured.

It is readily apparent that the methods previously described are extremely cumbersome and under certain conditions, such as continued use, could become unreliable, i.e., the spring gradient could change.

It is therefore an object of the invention to provide an improved means for measuring the torque of a rotating system.

Another object of the invention is to provide a torque measuring device which has a variable force.

A still further object of the invention is to provide a calibrated torque measuring device which is small, compact, endurable and economical of manufacture.

To these ends the invention contemplates the use of a hollow hub which is slotted so that it could fit over and clamp the shaft of a rotating component or end shaft of a gear train. About the hollow hub are mounted two disks which are capable of being rotated relative to each other. Each of the disks has a hollowed out portion so that when the hollowed out portions are 180° out of phase with each other there is equal weight distribution on either side of the torque measuring device. In other words the device can be said to be in static balance.

The rotation of the disks relative to each other produces an unbalanced mass whose unbalance varies as the position of the hollowed out portions of the disks vary to each other. The unbalanced mass being calculatable in advance is readily calibrated and is directly readable as a torque since the mass and its distance from the axis of rotation is a known factor.

The invention has other objects and advantages which will appear from the following description of a particular embodiment of the invention in conjunction with the accompanying drawings, in which:

FIGURE 1 shows an exploded view of a particular embodiment of the invention;

FIGURE 2 shows an exploded view of an alternate embodiment of the invention;

FIGURE 3 shows a front view of the embodiment of the invention shown in FIGURE 1;

FIGURE 4 shows a longitudinal cross sectional view of the invention taken along lines 4—4 of FIGURE 3;

FIGURE 5 shows a cross sectional view of the embodiment of the invention taken along lines 5—5 of FIGURE 4 with the mass of the disks displaced so as to create an unbalanced condition;

FIGURE 6 shows a front view of the invention shown in FIGURE 5;

FIGURE 7 shows a rear view of the embodiment of the invention shown in FIGURE 2;

FIGURE 8 shows a rear view of the embodiment of the invention shown in FIGURE 2 with the mass of the disks displaced so as to create an unbalanced condition; and FIGURE 9 shows a longitudinal cross sectional view of the invention taken along lines 9—9 of FIGURE 7.

With reference to the drawings of FIGURES 1, 3, 4, 5 and 6 there is shown a hub 10 about which is rotatably mounted a disk 11. The disk 11 is axially positioned on the hub 10 by a second disk 12, which is press fitted onto the hub, and a shoulder 13 on the hub. The hub 10 has a bore 14 therein which is slightly smaller than the diameter of a shaft which is to be received by the bore. Additionally one end of the hub is slotted 15 so that it can expand and receive the shaft.

There are two weights, semicircular in shape, 16 and 17 which are mounted within grooves 18 and 19 of disks 11 and 12 respectively. The weights 16 and 17 are positioned and fastened by means of pins 21 and 22 respectively. A flat spring 23 is mounted about the hub 10 between the two disks 11 and 12. There is a recess 24 cut within disk 11 for receiving the spring. The spring biases disk 11 so that it may be turned under some restraint.

On the outside of disk 11 there is engraved calibrations 25 representative of applied torques and on the outside of disk 12 there is engraved an index mark 26.

Referring to the embodiment shown in FIGURES 2, 7, 8 and 9 there is shown a hub 27 which is similar in construction to hub 10. There are two disks 28 and 29 mounted on the hub. Disk 28 is rotatably mounted on the hub and disk 29 is fixedly mounted thereon. Disk 28 is axially positioned on the hub 27 by means of disk 29 and a shoulder 30 on the hub. The hub 27 has a bore 32 therein which is slightly smaller than the diameter of a shaft which is to be received by the bore. Additionally one end of the hub is slotted 33 so that it can expand and receive the shaft.

The disks 28 and 29 have semi-circular hollowed out portions 34 and 35 respectively. These hollowed out portions are positioned angularly with respect to each other to vary the mass of the measuring device.

Pins 36 and 37 are press fitted into disks 28 and 29 respectively. Pin 36 is longer than pin 37 and extends into the hollowed out portion 35 of disk 29. The reason this is so is that the pin 36 acts as a stop and controls the extent of rotation of disk 28.

Pin 37 is a locating pin used for machining purposes only.

A flat spring 38 is mounted about the hub 27 between the two disks 28 and 29. There is a recess 39 cut within disk 28 for receiving the spring. The spring biases disk 29 so that it may be turned under some restraint.

On the outside of disk 28 there is engraved calibrations 40 representative of applied torque and on the outside of disk 29 there is engraved an index mark 41.

The operation of the invention will now be explained more fully. Whenever it is desired to measure the torque of a rotating component or a gear train then the instant torque measuring device is employed.

The disks are rotated relative to each other so that the index is on the zero marking. While in this position the torque measuring device is placed onto the shaft of the rotating component or the shaft of the gear train which is to be measured. The shaft is gripped by the slotted end of the hub. The disks are now rotated relative to each other until the shaft starts to rotate. The markings are now read, and the torque indicated thereon is the break away torque required to rotate the component or gear train.

Both embodiments of the invention are employed as described above.

Although I have described particular embodiments of the invention, it is understood that the present disclosure has been made by way of example and that numerous changes in the details of construction and the combination and arrangement of parts may be resorted to without departing from the spirit and the scope of the invention as hereinafter claimed.

What is claimed is:

1. A torque measuring device comprising, a hub for cooperating with a shaft whose torque is to be measured and a pair of disks rotatably mounted on said hub for relative movement with respect to each other, each of said disks having semicircular means therein for unbalancing each of said disks, at least one of said disks having an index mark thereon whereby displacement of said disks relative to each other is indicative of the torque being measured.

2. A torque measuring device comprising, a hub for cooperating with a shaft whose torque is to be measured, a pair of disks rotatably mounted on said hub for relative movement with respect to each other and a biasing means for biasing the rotation of said disks relative to each other, each of said disks having semi-circular means therein for unbalancing each of said disks, at least one of said disks having an index mark thereon whereby displacement of said disks relative to each other is indicative of the torque being measured.

3. A torque measuring device as claimed in claim 2 wherein said semi-circular means consists of said disks each having a circular groove therein and a pair of semi-circular weights, said weights being mounted one in each of said grooves.

4. A torque measuring device as claimed in claim 2 wherein said semi-circular means is a semi-circular hollowed out portion of said disk.

References Cited

UNITED STATES PATENTS

| | | | |
|---|---|---|---|
| 3,027,748 | 4/1962 | Brenner | 73—16 |
| 3,050,978 | 8/1962 | Livermont | 73—16 |
| 3,052,985 | 9/1962 | Harvey | 73—139 |

RICHARD C. QUEISSER, *Primary Examiner.*

J. H. WILLIAMSON, *Assistant Examiner.*